Sept. 27, 1960  H. K. GLEASMAN  2,953,945
TWO-SPEED HUB GEARING FOR VELOCIPEDES
Filed Feb. 3, 1959
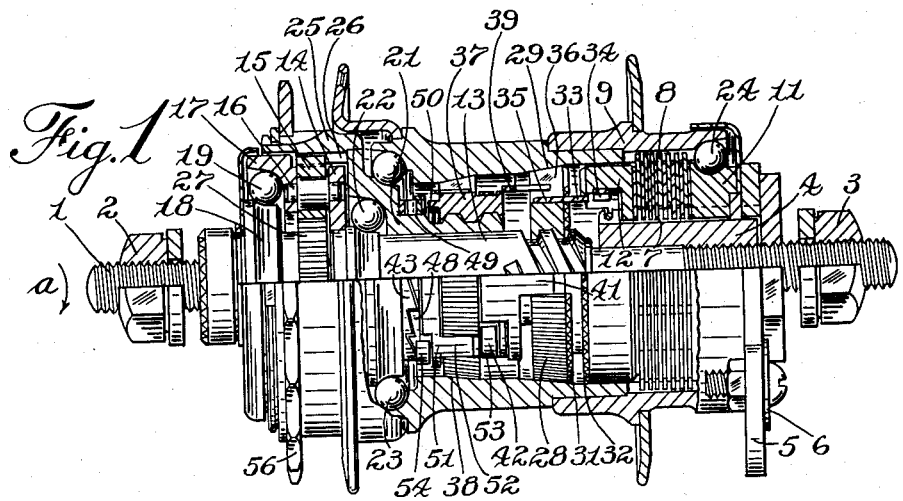
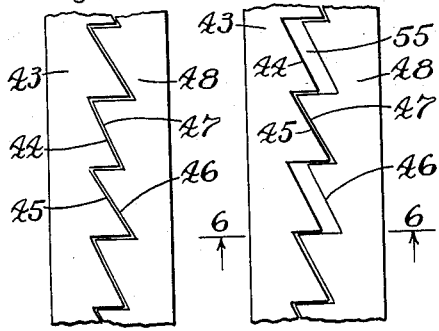
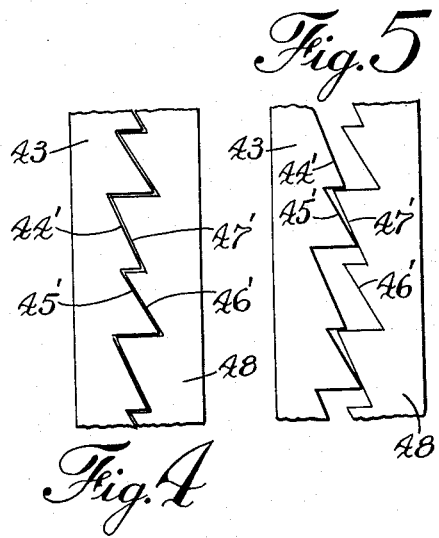
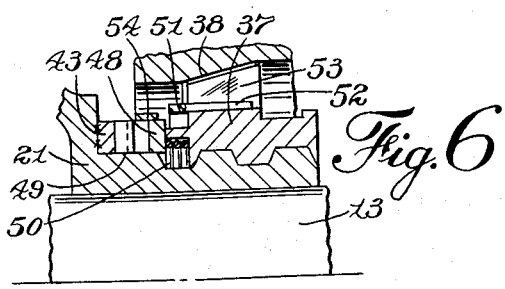
WITNESS:
Esther M. Stockton
INVENTOR.
Hollis K. Gleasman
BY
Clinton S. Janes
ATTORNEY

United States Patent Office 2,953,945
Patented Sept. 27, 1960

2,953,945

TWO-SPEED HUB GEARING FOR VELOCIPEDES

Hollis K. Gleasman, Elmira, N.Y., assignor to The Bendix Corporation, a corporation of Delaware Filed Feb. 3, 1959, Ser. No. 790,891

3 Claims. (Cl. 74—750)

The present invention relates to two-speed hub gearing for velocipedes and more particularly to that type of variable speed gearing in which the shift from one gear ratio to the other is brought about by a slight backpedalling movement of the parts.

The present invention is in some respects an improvement over the structure shown in applicant's prior applications, Serial Numbers 682,933 filed September 9, 1957, now Patent Number 2,882,754; 690,470 filed October 16, 1957, now Patent Number 2,903,913 and 714,596 filed February 11, 1958.

All of these back-pedalling shifts comprise the general combination of self-engaging low speed and high speed clutch drives, the low speed drive permitting the wheel hub to overrun when the high speed drive is operative, with means for preventing engagement of the high speed drive clutch when it is desired to operate in low gear.

It is an object of the present invention to provide a novel two speed hub of the above type which is efficient and reliable in operation while being simple and economical in construction.

It is another object to provide such a device in which the means for optionally preventing engagement of the high speed clutch is of simple and rugged construction.

It is another object to provide such a device in which no special timed relationship is required between said means and the elements to which they are operatively related.

Further objects and advantages will be apparent from the following description taken in connection with the accompanying drawing in which;

Fig. 1 is a side elevation partly broken away and in section of a preferred embodiment of the invention;

Fig. 2 is an enlarged detail of portions of the toothed abutment rings controlling the engagement of the high speed clutch, the rings being shown in their fully meshed or high gear relationship;

Fig. 3 is a view similar to Fig. 2, showing the toothed rings in their spaced or low gear position;

Fig. 4 is a view similar to Fig. 2, showing toothed rings having unequally spaced teeth;

Fig. 5 shows the toothed rings of Fig. 4 in spaced or low gear position; and

Fig. 6 is an enlarged sectional detail of the high speed clutch mechanism as held out of engagement to permit operation of the hub in low gear.

In Fig. 1 of the drawing there is illustrated a stationary axle 1 adapted to be mounted in the rear fork of a bicycle by means of clamp nuts 2, and 3. A brake anchor sleeve 4 is adjustably mounted on the axle 1 and prevented from rotation by an anchor arm 5 adapted to be attached to the frame of the bicycle by means of a clip 6 in the usual manner.

A plurality of brake discs 7 are splined on the anchor sleeve 4 and arranged to cooperate with a second set of brake discs 8 splined in the interior of the wheel hub 9. The brake discs are arranged to be compressed between an abutment ring 11 fixed on the anchor sleeve 4, and a thrust ring 12 splined on said sleeve.

A low speed screw shaft 13 is journalled on the axle 1 and has fixedly mounted thereon a planet carrier ring 14 in which a plurality of planet pinions 15 are rotatably mounted as by means of gudgeons 16. The outer ends of the gudgeons 16 are seated in a bearing cup 17 which is rotatably mounted on a fixed bearing cone 18 by means of bearings 19.

A high speed screw shaft 21 is rotatably mounted on the low speed screw shaft by means of bearings 22, and in turn supports the adjacent end of hub 9 by means of bearings 23. The opposite end of the hub 9 is supported by bearings 24 on the abutment ring 11.

A driving member 25 mounted on or formed integrally with the high speed screw shaft 21 has an internal orbit gear 26 meshing with the planet pinions 15; and a stationary sun gear 27 fixed on or formed integrally with bearing cone 18, also meshes with the planet pinions 15.

A low speed clutch nut 28 is threaded on the low speed screw shaft 13 for movement into clutching engagement with an interior conical surface 29 of the hub 9 by forward rotation of the low speed screw shaft. Backward rotation of the low speed screw shaft is arranged to traverse the low speed clutch nut 28 into engagement with the thrust ring 12, thus compressing the brake discs 7, 8 to apply the brake. The adjacent surfaces of the low speed clutch nut 28 and the thrust ring 12 are provided with teeth 31, 32 which engage and prevent rotation of the clutch nut 28 during the braking operation. A retarder sleeve 33 is formed with a spring arm 34 bearing frictionally in the interior of the thrust ring 12, and with a finger 35 extending into an axial slot 36 in the low speed clutch nut 28 to thereby frictionally retard rotation of said clutch nut to insure its translation responsive to rotation of the low speed screw shaft 13.

A high speed clutch nut 37 is threaded on the high speed screw shaft 21 for movement into and out of engagement with an interior conical surface 38 in the hub 9. A retarder sleeve 39 having a finger 41 also engaging in the slot 36 of the low speed clutch nut 28, has a spring arm 42 bearing frictionally on the high speed clutch nut 37 to insure its traversal responsive to rotation of the high speed screw shaft 21.

A toothed abutment ring 43 is fixedly mounted on the high speed screw shaft 21 in any suitable manner and is provided with laterally extending teeth 44 and 45 (Fig. 2) adapted to mesh between similarly formed teeth 46 and 47 on a cooperating abutment ring 48. Ring 48 is rotatably mounted on a smooth portion 49 of the high speed screw shaft 21 in the path of engaging movement of the high speed clutch nut 37. The high speed clutch nut is counterbored for the reception of a spring 50 which urges the movable abutment ring 48 into engagement with the fixedly mounted abutment ring 43.

The abutment ring 48 is frictionally connected to rotate with the high speed clutch nut 37 by means of a retarder ring 51 having a finger 52 slidably received in a slot 53 in the high speed clutch nut, and having a spring arm 54 bearing frictionally on the exterior surface of the abutment ring 48.

As shown in Figs. 2 and 3, the teeth 44, 45 of ring 43 are of saw tooth or buttress conformation, alternate teeth being unequal in height and the teeth 46, 47 on ring 48 are similarly formed. When, therefore, the high teeth 47 of ring 48 engage the low teeth 44 of ring 43 and the low teeth 46 of ring 48 engage the high teeth 45 of ring 43, the teeth mesh together completely as shown in Fig. 2. On the other hand, however, when the ring 48 has been indexed one tooth with respect to the ring 43 so that the high teeth 47 of the ring 48 engage the high teeth 45 of ring 43, the rings 43 and 48 are spaced apart by a distance 55 as shown in Fig. 3.

The thickness of the rings 43, 48 is such that when the rings are fully meshed as in Figs. 1 and 2, the high speed clutch 37 is permitted to travel to the left in Fig. 1 into operative engagement with the interior clutch surface 38 of the hub 9. When the rings 43, 48 are spaced apart as shown in Figs. 3 and 6, however, they arrest the engaging movement of the high speed clutch nut 38 before it can engage the hub.

In operation, starting with the parts in high gear driving relation as shown in Fig. 1, rotation of the driving member 25 in the direction of the arrow (a) by means of the sprocket 56 will cause the high speed clutch nut 37 to engage and rotate the hub 9 at the same speed of rotation as the driving member 25. At this time, the low speed clutch nut 28 will come into contact with the clutch surface 29 in the hub 9 but since the hub is rotating faster than the low speed screw shaft, the low speed clutch nut merely contacts the hub lightly.

When it is desired to operate in low gear the operator back pedals slightly thus rotating the high speed screw shaft 21 backward. Since backward rotation of the high speed clutch nut 37 is resisted by the drag members 39, 33 this backward rotation of the high speed screw shaft backs the high speed clutch nut away from engagement with the hub.

Since the abutment ring 48 is frictionally connected to the high speed clutch nut by the retarder 51, said ring is also prevented from backward rotation. The abutment ring 43, being rigidly mounted on the high speed screw shaft, will thus be indexed backward one tooth from its position shown in Fig. 2 to the position shown in Figs. 3 and 6, where its high teeth 45 engage the high teeth 47 of ring 48.

On subsequent forward rotation of the driving member 25, the ring 48 is positively rotated with the ring 43 by the engagement of their buttress teeth, while the high speed clutch nut is prevented by the ring 48 from engaging the hub. The rotation of the low speed screw shaft 13 by the planetary reduction gearing 26, 15, 27 then causes the low speed clutch nut 28 to engage and drive the hub.

It will be understood that the retarder 51 which controls the abutment ring 48 is made substantially less effective than the retarders 33 and 39 which control the clutch nuts, so that the action of the retarder 51 does not affect the action of retarders 33 and 39.

Shifting back into high gear is accomplished when desired by a second back pedalling operation which indexes the abutment rings 43, 48 into their fully meshed relationship as shown in Fig. 2, thereby again permitting engagement of the high speed clutch nut 37 with the hub.

In Figs. 4 and 5 of the drawing a variation in the formation of the abutment rings 43, 48 is illustrated in that the teeth 44′, 45′, 46′ and 47′ are of different angular extent as well as being of different depth. The operation of this form of the invention is the same as above described, but the amount of shifting motion to secure the indexing action varies slightly as between shifting down and shifting up, which in some instances may be deemed desirable.

Although certain structure has been shown and described in detail, it will be understood that changes may be made in the design and arrangement of the parts without departing from the spirit of the invention.

I claim:

1. In a two-speed hub for velocipedes or the like, a fixed axle, a low-speed screw shaft journalled thereon, a driving member including a high speed screw shaft rotatably mounted on the low-speed screw shaft, reduction gearing connecting the driving member to the low-speed screw shaft, a hub rotatably mounted on the driving member, a low-speed clutch member threaded on the low-speed screw shaft, a high speed clutch member threaded on the high speed screw shaft, said hub having interior clutch surfaces engaged by said clutch members responsive to forward rotation of their respective screw shafts, a toothed ring fixed on the driving member, a similarly toothed ring slidably journalled on the driving member adjacent and facing said fixed ring, in the path of engaging movement of the high speed clutch, the dimensions of said rings being such that they prevent the engagement of the high speed clutch with the hub except when the teeth of said rings are fully meshed with each other; in which alternate teeth of said rings are of unequal height, and including means for indexing the movable ring with respect to the fixed ring to bring its high teeth into and out of engagement with the high teeth of the fixed ring.

2. A device as set forth in claim 1, in which the means for indexing the movable ring includes a frictional retarding connection between the movable ring and the axle which is effective to prevent backward rotation of the movable ring when the driving member and the ring fixed thereon are rotated backward.

3. A device as set forth in claim 1 in which the consecutive teeth of the rings are alternately of greater and less angular extent, the high teeth of each ring being formed to mate with the low teeth of the other.

References Cited in the file of this patent

UNITED STATES PATENTS

| | | |
|---|---|---|
| 1,233,600 | Olsen | July 17, 1917 |
| 1,249,657 | Olsen | Dec. 11, 1917 |
| 2,865,478 | Hood | Dec. 23, 1958 |